US005534857A

United States Patent [19]

Laing et al.

[11] Patent Number: 5,534,857

[45] Date of Patent: Jul. 9, 1996

[54] METHOD AND SYSTEM FOR SECURE, DECENTRALIZED PERSONALIZATION OF SMART CARDS

[75] Inventors: Simon G. Laing; Matthew P. Bowcock, both of Sydney, Australia

[73] Assignee: Security Domain Pty. Ltd., Australia

[21] Appl. No.: 232,088

[22] PCT Filed: Nov. 10, 1992

[86] PCT No.: PCT/AU92/00608

§ 371 Date: Apr. 28, 1994

§ 102(e) Date: Apr. 28, 1994

[87] PCT Pub. No.: WO93/10509

PCT Pub. Date: May 27, 1993

[30] Foreign Application Priority Data

Nov. 12, 1991 [AU] Australia ................................ PK9443

[51] Int. Cl.[6] ................................ G07F 7/08; H04L 9/32

[52] U.S. Cl. ................................ 340/825.34; 340/825.3; 380/21; 380/23; 235/380

[58] Field of Search ........................ 340/825.31, 825.34, 340/825.33; 380/23, 24, 25; 364/401, 406; 235/380, 382, 382.5, 487

[56] References Cited

U.S. PATENT DOCUMENTS

| | | | |
|---|---|---|---|
| 4,453,074 | 6/1984 | Weinstein | 235/380 |
| 4,649,233 | 3/1987 | Bass et al. | 380/21 |
| 4,758,718 | 7/1988 | Fujisaki | 340/825.32 |
| 4,803,351 | 2/1989 | Shigenaga | 340/825.34 |
| 4,910,774 | 3/1990 | Barakat | 380/23 |
| 4,965,568 | 10/1990 | Atalla et al. | 340/825.34 |
| 5,068,894 | 11/1991 | Hoppe | 380/23 |
| 5,109,152 | 4/1992 | Takagi et al. | 325/380 |
| 5,193,114 | 3/1993 | Moseley | 380/23 |
| 5,196,840 | 3/1993 | Leith et al. | 340/825.3 |

FOREIGN PATENT DOCUMENTS

| | | | |
|---|---|---|---|
| 0374012 | 6/1990 | European Pat. Off. | G07F 7/10 |

*Primary Examiner*—Brian Zimmerman
*Assistant Examiner*—William H. Wilson, Jr.
*Attorney, Agent, or Firm*—Dressler, Goldsmith, Shore & Milnamow, Ltd.

[57] ABSTRACT

A method and apparatus for securely writing confidential data from an issuerer to a customer smart card at a remote location includes, establishing a communication link between a retailer data terminal device at the remote location and the issuer's secure computer. A communication link is established between a secure terminal device, which includes a smart card reader/writer, and the data terminal device. The retailer is authenticated to the issuer and the issuer to the retailer by means of a retailer smart card presented to the secure terminal device. A session key is established for enciphering data traffic between the secure terminal device and the issuer's computer using the retailer smart card. The customer smart card is presented to the secure terminal device. Confidential customer data is enciphered using the session key and it is written from the issuer's computer to the customer smart card.

10 Claims, 4 Drawing Sheets

METHOD AND SYSTEM FOR SECURE, DECENTRALIZED PERSONALIZATION OF SMART CARDS

TECHNICAL FIELD

This invention concerns a method for securely writing confidential data to smart cards in remote, insecure locations. In a second aspect the invention concerns a system for securely writing the confidential data. Smart Cards are used as a highly-secure means of storing data in a portable form. They are of particular use, for example, in cryptographic applications for the storage of cipher keys.

BACKGROUND OF THE INVENTION

When a smart card is manufactured, the manufacturer 'burns in' a unique identifying serial number. In addition the manufacturer installs a manufacturer's 'Master' Secret Code.

The card and the Master Secret Code are subsequently conveyed to the Issuer by separate means. Upon receipt by the Issuer the card is accessed by presenting the Master Secret Code and that code is then changed to a fresh 'Issuer' Secret Code not known to the manufacturer. One or more User Secret Codes are then stored in the card and used to protect access to confidential user data. Initial user data may then be stored in the card. The card and the User Secret Code(s) are ultimately conveyed to a user by separate means, and the appropriate User Secret Code(s) must be correctly presented to the smart card by the user, before access to the card is allowed.

The process of presentation of the Master Secret Code, storage of the Issuer Secret Code, storage of the User Secret Codes, and initial storage of user data, is commonly called Personalisation, and is traditionally done in a secure "Personalisation Centre" by the Issuer. This approach is costly, time-consuming and relatively insecure.

SUMMARY OF THE INVENTION

According to the present invention, as currently envisaged, there is provided a method for securely writing confidential data from an Issuer to a customer smart card at a remote location, comprising the steps of:

establishing a communications link between a retailer data terminal device at the remote location and the Issuer's secure computer;

establishing a communications link between a secure terminal device, which includes a smart card reader/writer, and the data terminal device;

authenticating the retailer to the Issuer and the Issuer to the retailer, by means of a retailer smart card presented to the secure terminal device;

establishing a session key for enciphering data traffic between the secure terminal device and the Issuer's computer, using the retailer smart card;

presenting the customer smart card to the secure terminal device; then enciphering the confidential data under the session key and writing it from the Issuer's computer to the customer smart card.

Preferably the method includes the step of establishing a second session key for enciphering data traffic between the data terminal device and the Issuer's computer.

Preferably the retailer is authenticated to the Issuer by entering a retailer secret code which is checked by the retailer smart card, then a cipher key is read from the retailer smart card to the secure terminal device and checked by a challenge sent by the Issuer. Optionally the Issuer is subsequently authenticated to the retailer using a cipher key which is read from the retailer smart card to the secure terminal device and used to challenge the Issuer.

Preferably the session keys are established by using a cipher key to encrypt the combined product of two random numbers, one of which was generated by the first party and sent to the second party, the other of which was generated by the second party and sent to the first party.

Advantageously the confidential data is an Issuer Secret Code present in the customer smart card to prevent access to the card, and required to open the card to accept data.

Preferably the confidential data comprises a directory and file structures, and data.

According to a further aspect of the invention, as currently envisaged, there is provided a system for securely writing confidential data from an Issuer to a customer smart card in a remote location, comprising:

the Issuer's secure computer;

a retailer data terminal device at the remote location selectively in communication with the computer by means of a communications link;

a secure terminal device at the remote location, including a smart card reader/writer, selectively in communication with the computer via the data terminal device;

a retailer smart card containing the data required to authenticate the retailer to the Issuer and the Issuer to the retailer, and the data required to establish a session key for enciphering traffic between the secure terminal device and the Issuer's computer;

a customer smart card able to accept the confidential data, when presented to the secure terminal device, written from the computer enciphered under the session key.

Preferably the retailer smart card also contains the data required to establish a second session key for enciphering traffic between the data terminal device and the Issuer's computer.

Preferably the confidential data is an Issuer Secret Code, present in the customer smart card to prevent access to the card, and required to open the card to accept data.

This method and system permit personalisation of the smart card at a location convenient to the customer, such as the point of sale of the item, or service, with which the smart card is subsequently to be used. Such locations are unlikely to be secure, may be widely dispersed from any central administrative centre, and may be operated by staff who do not work for the Card Issuer. Furthermore the method provides a decentralised personalisation service in a manner that ensures the security of all confidential data transferred between components of the system.

As smart cards are used more widely in mass consumer applications such as mobile telephony and Pay TV, the high volume of smart cards issued, and the widely dispersed customer population will make decentralised personalisation highly cost-effective and competitive.

Once the infrastructure for a decentralised personalisation system is in place, it can be used for securely loading data other than personalisation data into previously personalised smart cards.

DESCRIPTION OF THE PREFERRED EMBODIMENT

Method and system 1 involve the interaction of three entities:

The Issuer 2 is the organisation which ultimately provides the goods or services that are obtained through the use of the customer smart card. It is responsible for the system as a whole, for the purchase of smart cards, and for their supply to Retailers. This organisation could be the central office of a bank, or a telecommunications operator, for example.

The Retailer 3 is the institution which represents the Issuer 2 in a particular local area. It could be a bank branch, or a newsagent, for example.

The Customer 4 is the end-user of the service, and the holder of the smart card that gives access to that service.

The elements involved in the process of decentralised personalisation are:

A Central Administration System 5 (ADS).

A computer system in a secure location that is equipped to communicate by telecommunications links with the other, remotely sited, components of the system. These links are assumed to be insecure. The system 5 also includes a secure database of Retailer Keys.

A Data Terminal Device 6 (DTD).

A small computer system (such as a Personal Computer) located in the Retailer's premises. It is equipped to communicate, by a telecommunications link, with the Central Administration System. This system is not considered to be secure by the Issuer.

A Secure Terminal Device 7 (STE).

A tamper-resistant, programmable device comprising a numeric and function keypad, a display, and a smart card reader/writer. It communicates with the Data Terminal device 6 by a serial communications link.

Figure 4:
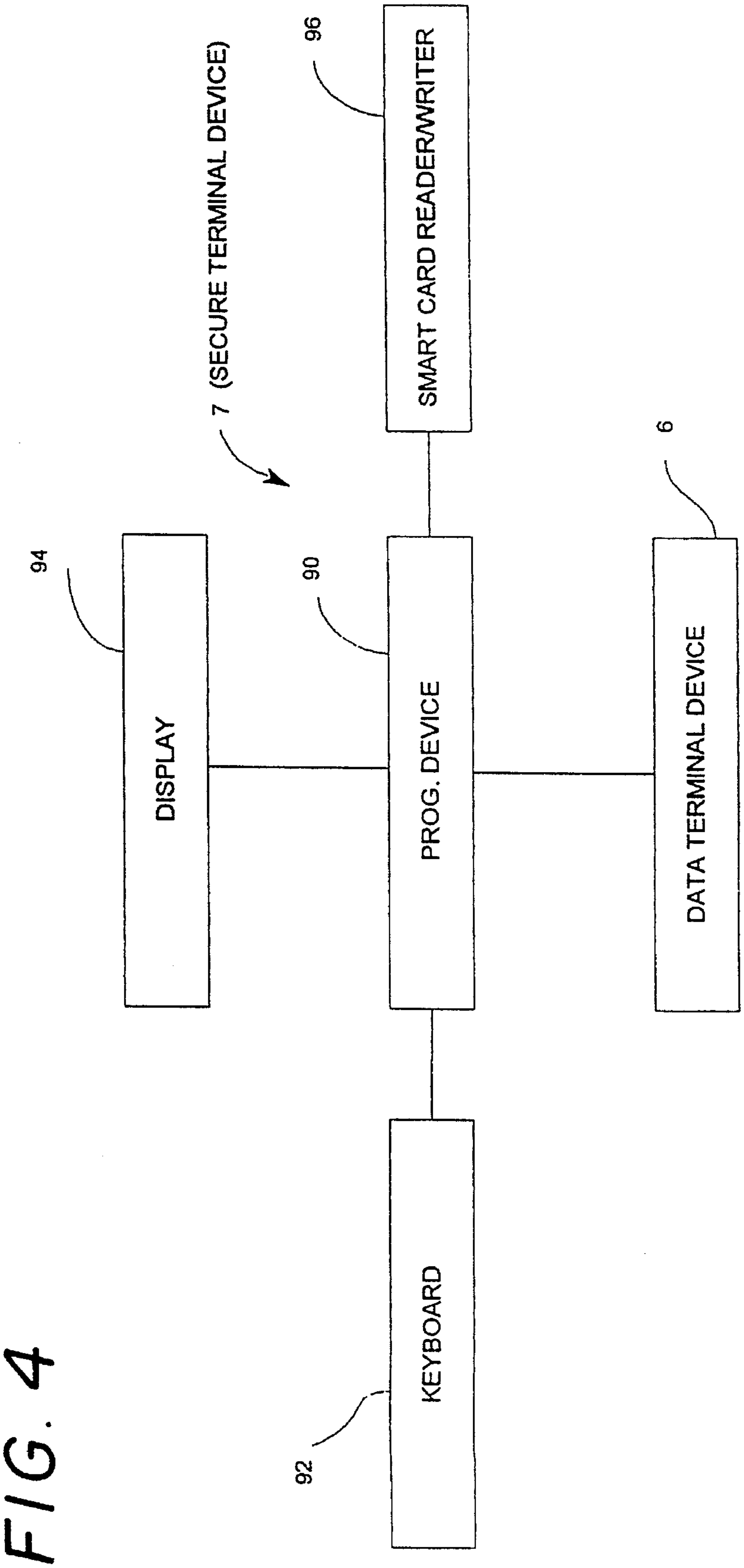
FIG. 4 is a block diagram of the secure terminal device STE7.

FIG. 4 is a block diagram of the secure terminal device STE7. That device includes a tamper-resistant programmable device 90 which in turn receives information from a key pad 92, displays information on a display 94 and is coupled to a smart card read/writer 96. It communicates with a data terminal device DTE6 via a serial communications link.

Smart Cards or Integrated Circuit Cards (ICC).

These are read and written to by the Secure Terminal device. Two categories of smart card are used within the system:

Retailer Cards 8

Each Retailer is issued with one Retailer Card, which has already been securely personalised by the Issuer. It contains the data required to gain access to, and use, the system. This data is protected from access by several Secret Codes, some known only to the Retailer, and some known only to the Central Administration System.

Customer Smart Cards 9

These are the smart cards that will be issued by the Retailer 3 to his Customers 4. They are held in stock in an unpersonalised state, exactly as they were shipped from the card manufacturer.

The operation of the method and system will be described by analysing each phase in the personalisation of a Customer smart card from the perspective of the Retailer. These phases are identified as:

Session Establishment;

Personalisation of Customer Smart Card;

Session Termination;

Modification of Data on Customer Smart Cards.

In general, there are several different operations involved in each phase.

Session Establishment

1) Retailer System Startup

On startup, the Data Terminal device sets up a communications link with the Central Administration System. This link is used for all future communications between the Central Administration System and the Data Terminal device.

2) Retailer Sign-On

Once the communications link is established, the Retailer is prompted to insert his Retailer Card in the Secure Terminal device. The Retailer is then prompted by the Secure Terminal device to enter his personal Secret Code which is passed directly to the smart card for checking.

3) Retailer Authentication

If the check of the Retailer's Secret Code succeeds, the Secure Terminal device reads a unique unprotected, read-only serial number from the smart card, and sends it to the Central Administration System via the Data Terminal device. Thus the Administration System knows which smart card is in use.

The Secure Terminal device then reads a unique cipher key out of a file on the smart card which was set up during personalisation so that it can only be read after the Retailer's Secret Code has been correctly presented.

The Central Administration. System then sends a random number (a challenge) to the Secure Terminal device, via the Data Terminal device. The Secure Terminal device enciphers the challenge using the cipher key read from the smart card and sends the result (the response) back to the Central Administration System. Since the Central Administration System maintains a record of the keys held on every Retailer Card issued, it is able to validate the response by also enciphering the random number challenge using the same cipher key, and comparing the result with the response received from the Secure Terminal device. If the two values are identical, the Retailer has successfully authenticated himself to the Central Administrative System.

Figure 1:
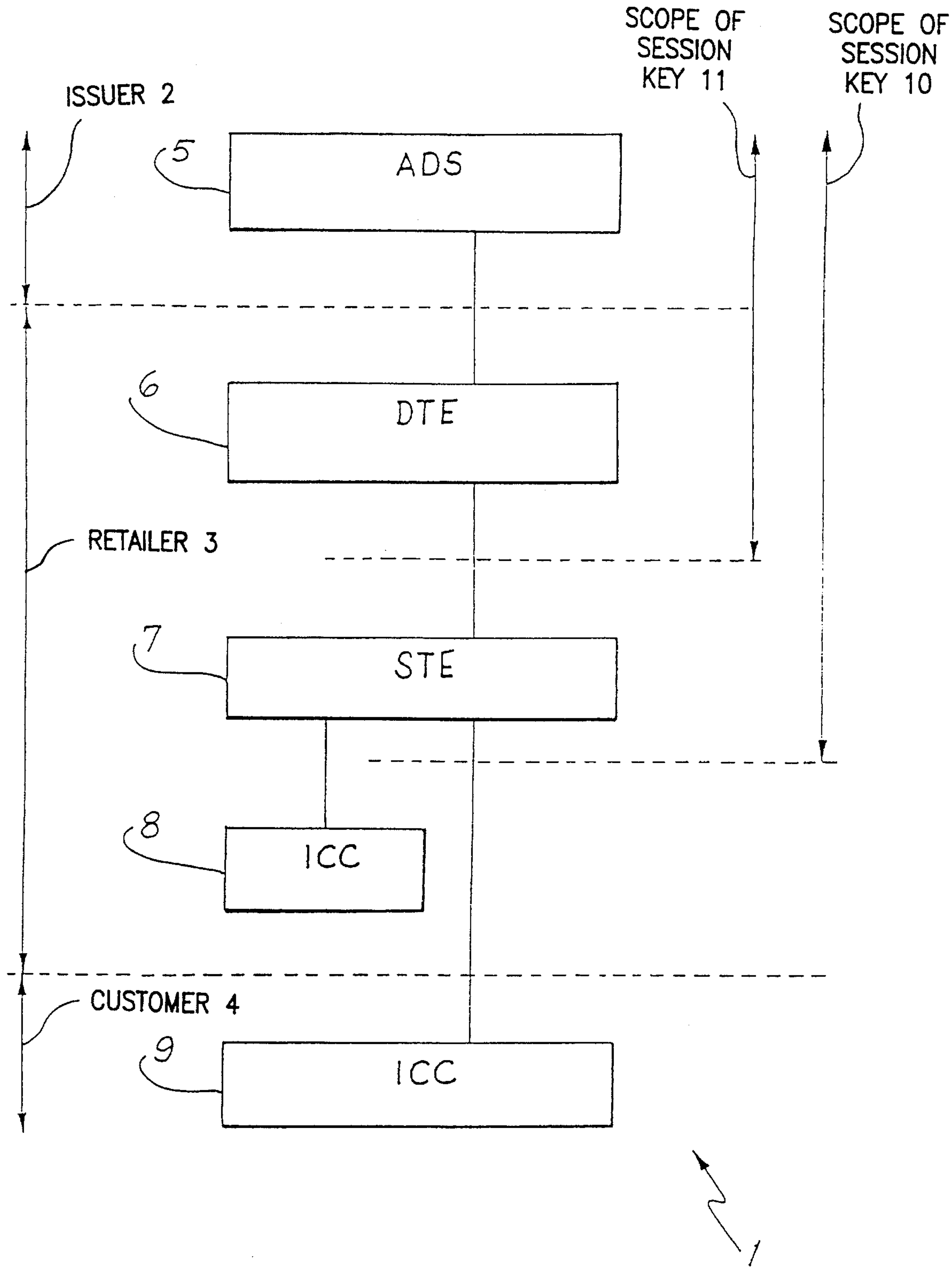
FIG. 1 is a schematic diagram showing the relationships between the components of a system according to the invention.
Figure 2:
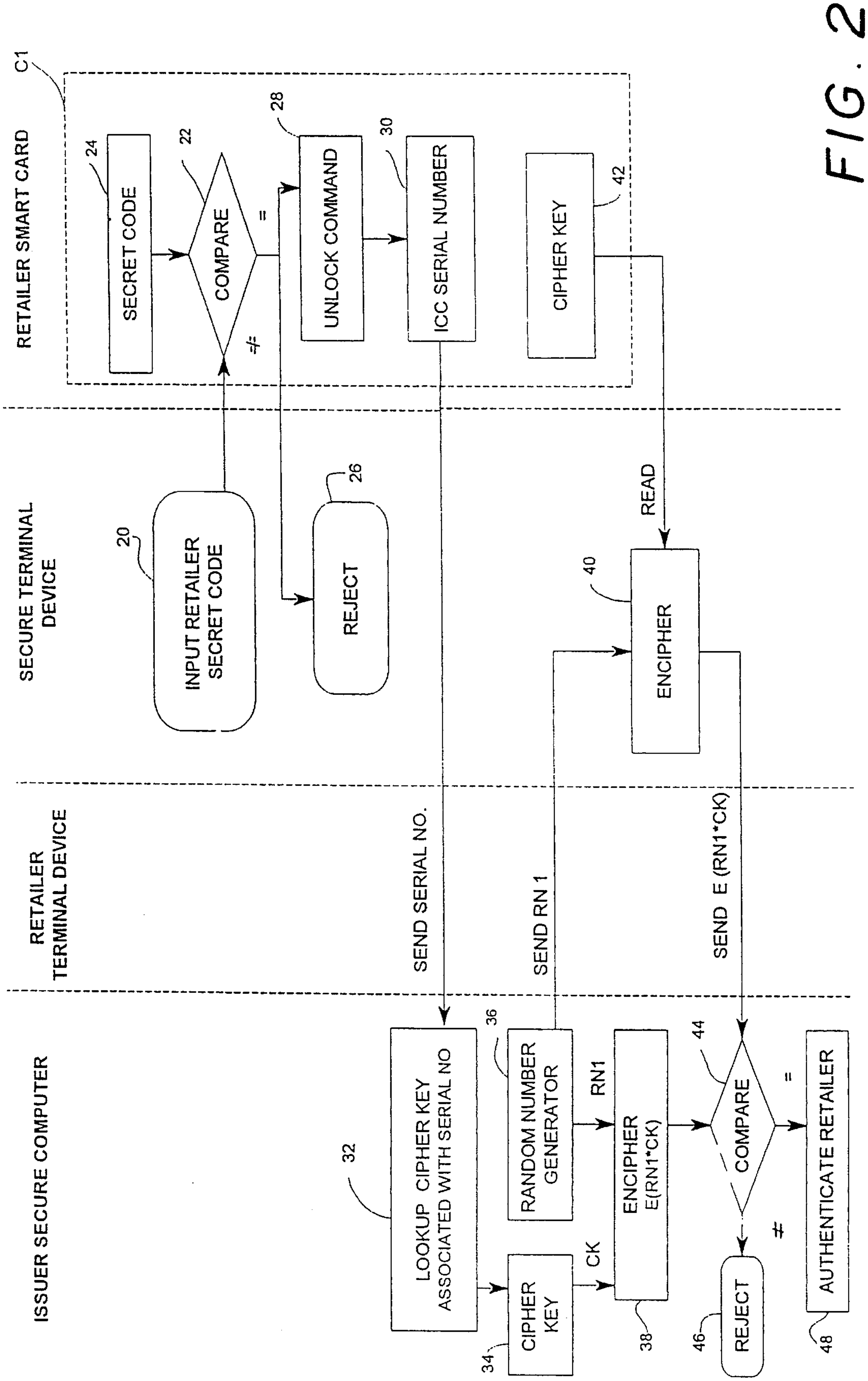
FIG. 2 is a schematic flow chart showing the steps of the method of writing confidential information from an issuer's secure computer to a customer smart card at a remote location up to authentication of the retailer.

With respect to FIG. 2, a retailer small card C1 is inserted into the secure terminal device. In a step 20, the retailer enters a personal security code which in a step 22 is compared to a secret code read from the retailer card C1 in a step 24. If the codes do not correspond, the terminal rejects the card C1 in a step 26. If the two codes do correspond, the terminal issues an unlock command in a step 28 and reads a unique, unprotected, read-only serial number from the card C1 in a step 30 and transmits that number to the issuer's secure computer. In a step 32 the issuer's secure computer retrieves a cipher key 34 associated with the serial number of the card C1 and in a random number generator 36 generates a random number RN1. The random number RN1 is then enciphered in a step 38. The random number RN1 is also transmitted to the secure terminal device and is enciphered in a step 40 using a cipher key 42 carried by the smart card C1. The enciphered output from the secure terminal device is then transmitted back to the secure computer and compared in a step 44 to the output of the local enciphering step 38. If there is no match, the transaction will be rejected in a step 46. If there is a match, the retailer will be authenticated in a step 48.

4) Issuer Authentication

Authentication of the Retailer only provides part of the security needed. It is equally important to ensure that the Central Administration System is authentic. This is achieved by performing an enciphered challenge-response in the reverse direction using a random data challenge generated within the Secure Terminal device, and using a key read from the Retailer Card. If the Central Administration System is authentic, it will also have a record of this key, and will be able to encipher the challenge and send back the correct response.

5) Establishment of Session Keys

Once both the Central Administration System and the Retailer System have authenticated each other, they can mutually establish session keys for enciphering future data traffic between them. This is done by one party sending the other a random number. Both parties then combine these two numbers together (for example, by exclusive ORing them) and encipher the result, using a key known only to them, to produce a new number—the Session Key. Future data traffic can then be enciphered using this session key. Whenever the session is terminated, and a new one started, new random numbers are used, resulting in a new session key.

Two session keys are required for securing communication between the different components of the system, one 10 between the Secure Terminal device 7 and the Central Administration System 5 and a second, optional, key 11 between the Data Terminal device 6 and the Central Administration System 5. By using different session keys, tight security can be maintained because intermediate parties in an exchange of messages between two parties are not privy to the contents of the messages they are simply passing on.

6) Collection and Transmission of Customer Details

The Retailer may now obtain from the Customer any personal data required by the Central Administration System before personalisation of a Customer smart card can proceed. This data may be entered into the Data Terminal device, enciphered under the Data Terminal device-Central Administration System session key 11 (to protect the confidentiality of the Customer data in transit over the link), and sent to the Central Administration System.

7) Assessment of Customer Data

If appropriate, the Central Administration System now checks the Customer data (for example, runs a credit check), and determines whether or not personalisation of a Customer smart card may proceed. The decision is communicated to the Retailer via the Data Terminal device.

Personalisation of Customer smart card

8) Selection of Customer smart card

If the Central Administration System allows personalisation to proceed, the Retailer removes his Retailer Card from the Secure Terminal device, selects a smart card from stock, and inserts it in the Secure Terminal device. The identity of the smart card is then communicated to the Central Administration System, either by the Retailer entering identifying information into the Data Terminal device, or by the Secure Terminal device reading a Serial Number out of the smart card and sending it to the Central Administration System.

9) Presentation of Manufacturer's Master Secret Code

At this stage, the smart card is protected from general access by a unique Master Secret Code written into it by the manufacturer. The method by which the Master Secret Code can be computed for any smart card in a batch will have been separately communicated to the Card Issuer. In order to gain access to the smart card, its Master Secret Code must be presented and this is done by computing the Master Secret Code in the Central Administration System then sending it to the Secure Terminal device, enciphered under the Central Administration System-Secure Terminal device session key 10. In the Secure. Terminal device, it is deciphered and presented to the smart card. This has the effect of opening up the smart card for further accesses.

10) Smart Card Set Up

Once the smart card has been "opened" by presentation of the Master Secret Code, it can be set up to meet the Customer's and Issuer's requirements. This involves creating various data structures on the smart card, and writing appropriate data to them, and to other locations on the smart card. All instructions on the manner in which the smart card is to be set up are sent from the Central Administration System enciphered under the Central Administration System-Secure Terminal device session key 10. Similarly, all data written to the smart card are sent from the Central Administration System enciphered under the Central Administration System-Secure Terminal device session key 10.

11) Entry of Customer Secret Code

At this point, the Customer may be required to enter the Secret Code he will subsequently use to protect access to his personal data held on the smart card. He is prompted on the Secure Terminal device display to enter his Customer Secret Code, and does so using the Secure Terminal device's keypad. This ensures that nobody else, not even the Retailer, knows his Secret Code, The entered Secret Code is written to the smart card where it is securely stored to be used by the smart card microprocessor to validate future presentations of the Customer Secret Code.

Figure 3:
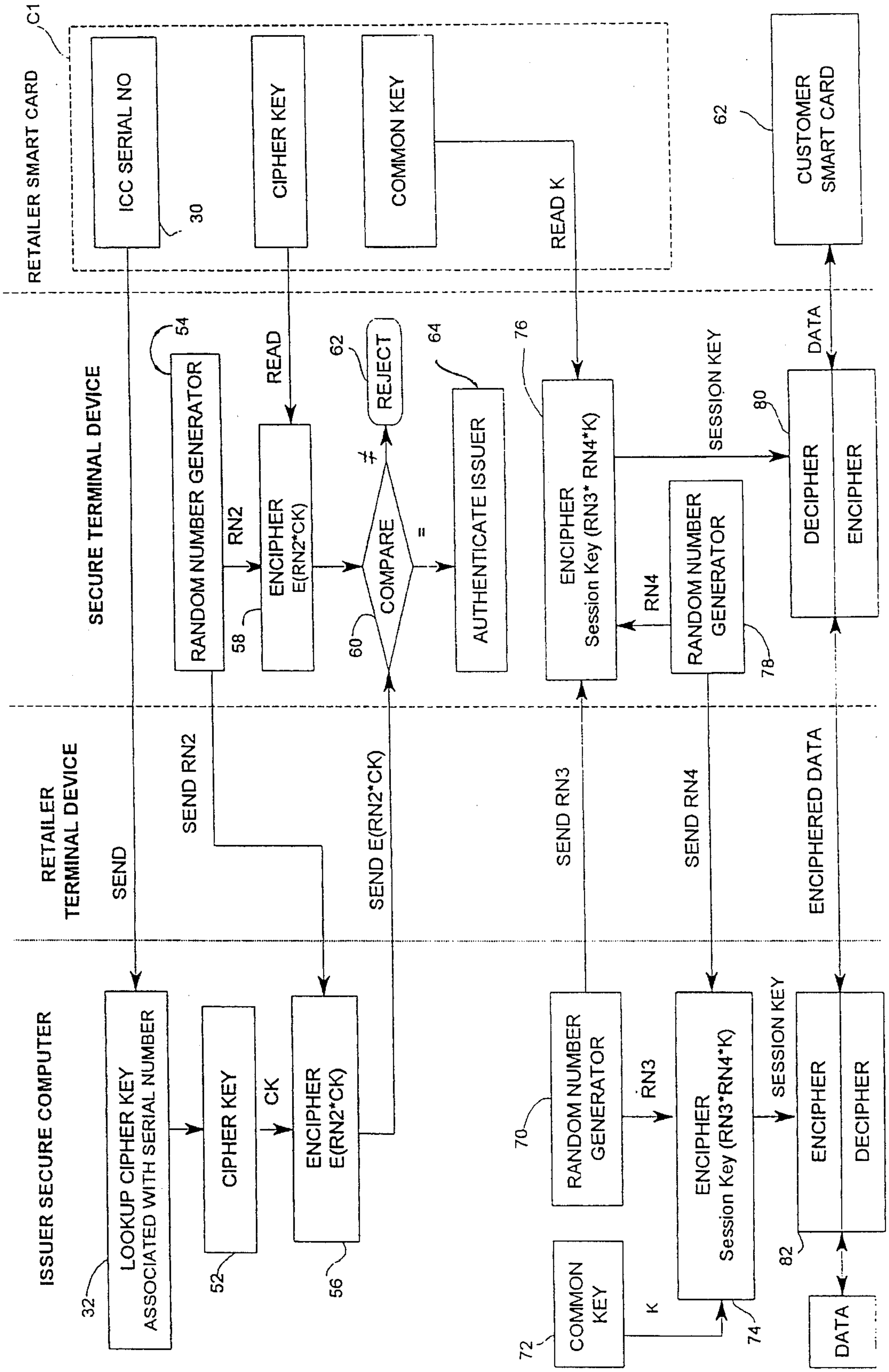
FIG. 3 is a schematic flow chart showing the steps of the method of writing confidential information from an issuer's secure computer to a customer smart card at a remote location up to enciphered data transfer between the customer smart card and the secure computer.

With respect to FIG. 3, the issuer is first authenticated. In a step 52, at the issuer's secure computer, a cipher key associated with the serial number which had been previously received in step 32, is determined. The associated cipher key is retrieved in a step 52. The secure terminal device in a step 54 uses a random number generator to generate a random number RN2. This random number is transmitted to the issuer's secure computer and enciphered in a step 56. It is also enciphered at the secure terminal device in a step 58. The issuer's secure computer transmits the enciphered result from the step 56 to the secure terminal device which compares in a step 60 that received enciphered result to the locally generated enciphered result, from the step 58. If there is no match, the attempt at authentication of the issuer is rejected in a step 62. In the event in a step 60 the two enciphered codes match, in a step 64, the terminal authenticates the issuer. Once the issuer's secure computer has been authenticated at the secure terminal device, a session key can be established. A random number generator 70, at the issuer's secure computer, generates a random number RN3 and transmits same to the secure terminal device. Using a common key 72 associated with the retailer smart card C1 present at the issuer's secure computer, the common key and the random number RN3 along with another random number, RN4 received from the secure terminal device, generated in a step 78, are enciphered to produce a session key. Similarly, at the secure terminal device in a step 76, the locally generated random number RN4 along with the received random number RN3 and the common key from the retailer smart card C1 are enciphered in the step 76 to produce the session key at the secure terminal device. As is apparent from FIG. 3, a session key is required at the secure terminal device as well as to the issuer's secure computer. Information in steps 80, 82 can be transmitted between the customer's smart card, C2 and the issuer's secure computer after enciphering and deciphering using the session key. This is a bidirectional data transmission.

Session Termination

12) Customer Smart Card Handover

The Customer may now remove his smart card from the Secure Terminal device and begin to use it.

13) Termination of Communications Session

The communications session with the Central Administration System is now terminated, which involves erasure of all session keys that were being used.

14) Breaking of Communications Link

The communications link with the Central Administration System may now be broken, or left open for use in the personalisation of other smart cards.

Modification of Data on Customer smart cards

There may be a need to modify some of the secure data on the Customer's smart card, at some stage after personalisation. This can be accomplished by using exactly the same method, but varying the data that is written to the Customer smart card during the "Smart Card Set Up" step.

With respect of FIG. 4, the secure terminal device STE7 includes a tamper-resistant programmable device 90 which in turn receives information from a key pad 92, displays information on a display 94 and is coupled to a smart card read/writer 96. It communicates with a data terminal device DTE6 via a serial communications link.

An Example of Practical Implementation

To take a specific example, the GSM digital mobile telephone network relies upon smart cards called Subscriber Identity Modules (SIMs), inserted in mobile telephone handsets to authenticate users as valid subscribers to the network. It also subsequently uses the Subscriber Identity Module to generate a different session key for each phone call made. This session key is used to encipher all data, such as voice data, transmitted from, and to, that mobile telephone during that call. In order to operate, therefore, each Subscriber Identity Module must be individually initialised to contain unique, identifying information and cryptographic keys prior to issue to a subscriber.

Each Retailer is provided with the following:

- a Personal Computer (Data Terminal device);
- a secure, tamper-resistant PIN pad (Secure Terminal device), which incorporates a smart card reader;
- a Retailer smart card, already personalised by the Issuer and set up to contain:
  - a Retailer Secret Code known only to the Retailer;
  - cipher keys known only to the Issuer, in a file protected by an Issuer Secret Code from general access;
  - a stock of unpersonalised blank Subscriber Identity Modules, that are protected from general access by a Manufacturing Secret Code.

When a prospective new Subscriber to the network approaches the Retailer to open a subscription, the Retailer establishes a communications link with the Central Administration System, using his Retailer smart card to authenticate himself, and to authenticate the Central Administration System, and to establish session keys between the Secure Terminal device and Central Administration System, and between the Data Terminal device and Central Administration System.

The Retailer then enters the new Subscriber's personal, and financial details into the Data Terminal device, where they are enciphered using the Central Administration System-Data Terminal device session key and sent to the Central Administration System. In the Central Administration System, the details are deciphered and used to run a credit check on the new Subscriber. If this is successful, the Retailer is notified, by means of an enciphered message sent from the Central Administration System to the Data Terminal device, that personalisation can proceed.

The Retailer selects a Subscriber Identity Module from his stock, depending on Subscriber preference, and the type of mobile telephone the Subscriber will use. He inserts the Subscriber Identity Module in the Secure Terminal device and the personalisation data is sent from the Central Administration System, enciphered under the Central Administration System-Secure Terminal device session key. This data is deciphered in the Secure Terminal device before being written to the Subscriber Identity Module. This data includes instructions on the directory and file structures to be set up in the Subscriber Identity Module, as well as the information that is to be written to certain of these files, and to other locations in the Subscriber Identity Module. Data of particular note that is written to the Subscriber Identity Module at this time is:

- the Subscriber's unique International Mobile Subscriber Identification (IMSI) number;
- the authentication key (Ki);
- the Subscriber Identity Module Service Table, which defines which of the available network services the Subscriber has actually accepted;
- the PLMN Selector, which sets up an initial order of preference for the selection of network, when the Subscriber is out of range of his home network.

Once the Subscriber Identity Module has been set up, the Subscriber may enter his PIN Code (which will be his personal Secret Code protecting access to the Subscriber Identity Module) into the Secure Terminal device, which writes it to the Subscriber Identity Module. He may also enter his PIN unblocking key which is also written to the Subscriber Identity Module for use in the event the user forgets his PIN code.

The telephone number of the Subscriber is then communicated, enciphered under the Central Administration System-Data Terminal device session key, from the Central Administration System to the Data Terminal device. The Retailer informs the Subscriber of the number, prints out a record of the entire transaction, and hands the new Subscriber his Subscriber Identity Module. The Subscriber is then in a position to use the network.

At this point all communications sessions are terminated by the erasure of the session keys and the communications link may be broken.

Since all information written to the Subscriber Identity Module originated from the Central Administration System, the Central Administration System holds a complete record of what is stored on the Subscriber Identity Module, as well as personal, financial and other Subscriber information. It is therefore able to route calls to the Subscriber, allocate charges correctly as they are incurred, and issue bills.

We claim:

1. A method for securely writing confidential data from issuer's secure computer to a customer smart card presented to a secure terminal device with smart card reader/writer connected to a retailer's data terminal device at a remote location, including the steps of:

(a) establishing a communications link between the data terminal device and the secure computer;

(b) authenticating the retailer to the issuer by:

(i) presenting a retailer smart card to the secure terminal device reader/writer and establishing access to information stored in the smart card by entering a retailer secret code into the secure terminal device to unlock the retailer smart card (ii) reading data from the unlocked retailer smart card and sending only information pertaining to the identity of the retailer smart card to the secure computer;

(iii) generating and sending from the secure computer a first random number to the secure terminal device;

(iv) enciphering the first random number at the secure terminal device using a cipher key read from the unlocked retailer smart card, the cipher key having a value unrelated to the retailer secret code, and sending the enciphered first random number back to the secure computer;

(v) comparing the retailer smart card identification data with data stored in the secure computer to identify the retailer smart card, then retrieving a cipher key stored in the secure computer associated with the identification data and enciphering the first random number with the cipher key; and (vi) comparing the enciphered first random number received from the secure terminal device with the enciphered first random number generated in the secure computer to authenticate the retailer when the values of the enciphered first random numbers are identical;

(c) establishing a mutual session key for enciphering data transfer between the secure terminal and the secure computer after authentication of the retailer to the issuer has been effected, the mutual session key being generated by using a common key stored in the secure computer and the retailer smart card;

(d) retrieving the retailer smart card and subsequently presenting the customer smart card to the secure terminal device;

(e) enciphering at the secure computer, the confidential data to be written to the customer smart card using the mutual session key and sending the enciphered confidential data to the secure terminal device; and (f) deciphering at the secure terminal device, the enciphered confidential data using the mutual session key and writing the confidential data on to the customer smart card.

2. A method according to claim 1 including, after step (b), the step of (g) authenticating the issuer to the retailer by performing an enciphered challenge-response including:

(i) generating at the secure terminal device a second random number, sending the second random number to the secure computer, and enciphering the second random number using a cipher key read from the unlocked retailer smart card;

(ii) using the identification data of the retailer smart card, for the purpose of retrieving the cipher key stored in the secure computer associated with the identification data, enciphering the second random number using the cipher key and sending: the enciphered second random number back to the secure terminal device; and (iii) comparing the enciphered second random number received from the secure computer with the enciphered second random number generated in the secure terminal device to authenticate the issuer when the values of the enciphered second random numbers are identical.

3. A method according to claim 1 or claim 2, wherein the session key is established by the secure computer generating and sending a first random number to the secure terminal device, the secure terminal device generating a second random number and sending the second random number to the secure computer, the secure computer and the secure terminal device each enciphering the combined product of the two random numbers using the common key stored in the secure computer and the retailer smart card to generate the session key.

4. A method according to claim 1, wherein the confidential data to be written on the customer smart card is an issuer secret code which enables locking and unlocking of the customer smart card, the issuer secret code being required to unlock the card to accept data.

5. A method according to claim 4, wherein the data also comprises a directory and file structures and other consumer specific data.

6. A method according to claim 1, wherein a second session key is established for enciphering traffic between the data terminal device and the issuer's secure computer in a manner analogous to the establishment of the session key for enciphering traffic between the secure terminal device and the secure computer.

7. A system for securely writing confidential data from an issuer to a customer smart card in a remote location comprising:

an issuer's secure computer containing data pertaining to the identification of a plurality of retailer smart cards and respective associated cipher keys;

a retailer data terminal device at the remote location selectively in communication with the secure computer by means of a communications link;

a secure terminal device at the remote locating including a smart card reader/writer, selectively in communication with the secure computer via the data terminal device;

a retailer smart card containing data required to authenticate the retailer to the issuer including a retailer secret code to enable unlocking of the smart card upon positive comparison, with a secret code inputted into the secure terminal device, data pertaining to the identity of the smart card, a cipher key to encipher an authentication challenge generated by the secure computer and sent to the secure terminal device, and data required to establish a session key for enciphering traffic between the secure terminal device and the secure computer including a common cipher key stored in the retailer smart card and the secure computer; and a customer smart card able to accept the confidential data, when presented to the secure terminal device, sent from the computer to the secure data terminal after being deciphered using the session key.

8. A secure terminal which can be coupled to a remote computer, and a data link, intended for use with first and second, different, authorization cards comprising:

a programmed processor;

an input device coupled to said processor; and a card reader/write coupled to said processor wherein said processor includes means for reading a first indicium from a first card and a second indicium entered via said input device and for comparing same, said processor including means, responsive to said comparing for reading a third, identifying, indicium from said first card and for transmitting same to the remote computer and for receiving a random number response from the remote computer, associated with said identifying indicium, and for reading a fourth, key indicium from the first card for combining said random numeric response with said key indicium thereby producing an enciphered random numeric response sent to the remote computer for authentication, wherein said processor includes means for establishing a different transaction enciphering key in response to said authentication and wherein said processor includes means for reading a second card and for authorizing transactions using said transaction key and an identifying indicium carried by said second card and not entered by said input device.

9. A terminal as in claim 8 wherein said processor includes means for entering onto said second card a user specified identifying indicium different from said transaction enciphering key.

10. A terminal as in claim 8 wherein said processor includes means for terminating communication with the remote computer and wherein said transaction enciphering key is erased in response to said termination.

* * * * *